(12) United States Patent
Kalliokulju et al.

(10) Patent No.: US 8,284,683 B2
(45) Date of Patent: Oct. 9, 2012

(54) SELECTING AN OPERATIONAL MODE OF A CODEC

(75) Inventors: Juha Kalliokulju, Vesilahti (FI); Igor Curcio, Tampere (FI)

(73) Assignee: Sisvel International S.A., Luxembourg (LU)

( * ) Notice: Subject to any disclaimer, the term of this patent is extended or adjusted under 35 U.S.C. 154(b) by 1479 days.

(21) Appl. No.: 10/229,951

(22) Filed: Aug. 27, 2002

(65) Prior Publication Data
US 2003/0063569 A1    Apr. 3, 2003

(30) Foreign Application Priority Data
Aug. 27, 2001    (FI) .................................... 20011715

(51) Int. Cl.
*G01R 31/08*    (2006.01)
(52) U.S. Cl. ........................................ 370/252; 370/392
(58) Field of Classification Search .................. 370/229, 370/252, 329, 350, 352, 394, 468, 503
See application file for complete search history.

(56) References Cited

U.S. PATENT DOCUMENTS

| | | | |
|---|---|---|---|
| 8,556 A | | 7/1901 | Bauer et al. |
| 6,128,513 A | * | 10/2000 | Faerber .................... 455/561 |
| 6,421,527 B1 | * | 7/2002 | DeMartin et al. ........ 455/67.13 |
| 6,452,941 B1 | * | 9/2002 | Bruhn ...................... 370/468 |
| 6,556,587 B1 | * | 4/2003 | Svanbro et al. .......... 370/471 |
| 6,574,213 B1 | * | 6/2003 | Anandakumar et al. .... 370/349 |
| 6,714,907 B2 | * | 3/2004 | Gao ......................... 704/220 |
| 7,023,839 B1 | * | 4/2006 | Shaffer et al. ............ 370/356 |
| 2001/0041981 A1 | * | 11/2001 | Ekudden et al. ........ 704/270.1 |
| 2001/0043577 A1 | * | 11/2001 | Barany et al. ............ 370/328 |
| 2002/0163908 A1 | * | 11/2002 | Lakaniemi et al. ....... 370/350 |
| 2002/0191556 A1 | * | 12/2002 | Krishnarajah et al. .... 370/329 |
| 2004/0062274 A1 | * | 4/2004 | Hakansson et al. ...... 370/468 |

FOREIGN PATENT DOCUMENTS

| | | |
|---|---|---|
| EP | 1024638 | 8/2000 |
| EP | 1079573 | 2/2001 |
| WO | 0178430 | 10/2001 |
| WO | 0230098 | 4/2002 |

OTHER PUBLICATIONS

3GPP TS, "3rd Generation Partnership Project; QoS Concept and Architecture", release 1999, pp. cover, 3, 4, & 33.*
Johan Sjoberg et al., "draft of RTP payload format for AMR", Feb. 14, 2001, pp. 1-18.*

* cited by examiner

*Primary Examiner* — Jung Park
(74) *Attorney, Agent, or Firm* — Ware, Fressola, Van Der Sluys & Adolphson LLP

(57) ABSTRACT

The present invention describes a method for selecting a preferable codec mode for a connection between a first communication device (UE1) and a second communication device (UE2), where the devices communicate via a network. An element in the network observes a quality of said connection. The quality is based on a data error level of network resource. Based on the observation the network element judges a preferable operational mode of the codec, from a group of operational modes of the codec. The preferable codec mode is based on the quality level of the connection. In the preferred embodiment, if a Radio Network Controller (RNC) observes congestion by observing Real-Time Protocol (RTP) header information, the RNC judges a lower codec mode for the connection. The lower mode for the connection is judged if there is at least one gap in a sequence of detected packets.

34 Claims, 6 Drawing Sheets

SELECTING AN OPERATIONAL MODE OF A CODEC

CROSS REFERENCE TO RELATED APPLICATIONS

This application claims priority under 35 U.S.C. §119 to Finnish Application No. 20011715 filed Aug. 27, 2001.

FIELD OF THE INVENTION

This invention relates to a selection of an operational mode of a codec between communication devices where the communication devices communicate via a network.

BACKGROUND OF THE INVENTION

In wireless telecommunication systems information is transferred in an encoded form between a transmitting communication device and a receiving communication device. The transmitting communication device encodes original information into encoded information and sends it to the receiving communication device. The receiving communication device decodes the received encoded information in order to recreate the original information. The encoding and decoding is performed in codecs. Thus, the encoding is performed in a codec located in the transmitting communication device, and the decoding is performed in a codec located in the receiving communication device. However, since there are many different codecs available, the transmitting terminal and the receiving terminal have to agree upon the codec(s) to be used in a session. The selection of the codec takes place during the communication.

The GSM (Global System for Mobile Communication) codec mode selection over air interface is described next. The codec mode related information, which is transmitted on each link, contains CMI (Codec Mode Indication(s)) and CMC (Codec Mode Command(s)) in the downlink, respectively CMI and CMR (Codec Mode Request(s)) in the uplink. The CMI informs the receiver about the currently applied codec mode. The CMC informs the other end about the codec mode to be applied on the other link. The CMR informs the other end about the preferred codec mode on the other link. In the GSM, the codec mode information is transmitted in the speech traffic channel, using a part of its transmission capacity. Codec modes are constrained to change only every second speech frame. The CMCs/CMRs and the CMIs are altered such that they occur only every second frame. For codec mode adaptation the receiving side performs link quality measurements of the incoming link. The measurements are processed yielding a Quality Indicator (QI). For uplink (UL) adaptation, the QI is directly fed into the UL mode control unit. This unit compares the QI with certain thresholds and generates, also considering possible constraints from network control, the CMC indicating the codec mode to be used on the uplink. The CMC is then transmitted in the speech traffic channel to the mobile side where the incoming speech signal is encoded in the corresponding codec mode. For downlink (DL) adaptation, the DL Mode Request Generator within the mobile compares the DL Quality indicator with certain thresholds and generates a CMR indicating the preferred codec mode for the DL. The CMR is transmitted in the speech traffic channel to the network side where it is fed into the DL Mode Control unit. This unit generally grants the requested mode. However, considering possible constraints from network control, it may also override the request. The resulting codec mode is then applied to encoding of the incoming speech signal in downlink direction. Both for uplink and downlink, the presently applied codec mode is transmitted in the speech channel as CMI together with the coded speech data. At the decoder, the CMI is decoded and applied for decoding of the received speech data. In both UL and DL, there is always a transcoder in the network. The transcoder causes delays in the communication. Disadvantageously, the codec mode selection is only based on the quality of the radio interface.

The communication of the encoded information is critical for error free data communication in real-time applications such as a voice call. For example, in the voice call it is more preferable to use lower bit rate such as a lower codec mode with fewer errors than higher bit rate with larger number of errors. Generally, the communication of the real-time application uses lower bit rates with few data errors rather than high bit rates with data errors. The errors are due to packet losses or bit errors. Therefore, the selection of the codec is an important compromise between the data speed and QoS (Quality of Service).

One solution to provide feedback on the quality of the data distribution is an additional companion protocol, RTCP (Real-Time Control Protocol) operating in VoIP (Voice over Internet Protocol) systems. The transmitting communication device can make use of RTCP information to adapt the applied encoding scheme to changes in the network load in order to improve service at the receiving communication device. This requires that the devices support the RTCP that is undesirable because the devices would require more processing power and memory. The increase in required processing power leads to higher power consumption which is undesirable in wireless user terminals operated by a battery. Because the RTCP information needs to be communicated in backward direction, the communication of the RTCP information reserves and reduces network capacity from the actual services. One solution to reduce the network capacity is a header removal technique which is a method where the RTCP can be separated from the actual data. Thus, the actual data stream runs separately from the RTCP information. If the header removal is applied to the data stream, the RTCP needs to be run on a parallel PDP (Packet Data Protocol) context. However, the header removal technique requires additional mechanisms to link or create the removed header to the 'header removed data'. Therefore, a substantial associative problem to link the data and the header emerge when the header removal of the packet is used because a recognition whether a packet is the RTCP packet or not is very difficult. There are other packets with or without the header in the data stream. Thereby, substantial difficulties emerge again in the linking. There is a need to observe the quality of the entire connection between the transmitting and receiving communication device and based on the observed quality select a communication mode depending on the quality.

SUMMARY OF THE INVENTION

According to a first aspect of the invention there is provided a method for selecting an operational mode of a codec of at least a first communication device, the method comprising:
communicating from the first communication device information indicating from a group of operational modes of the codec, that operational mode which the first communication device uses for a connection between the first and a second communication device, where the first and the second communication device communicate via a network, observing a quality level of the connection between the first and the second communication device in the network, and, based on the observing,
selecting an operational mode of the codec depending on the quality level.

Preferably, the quality level contains a data error rate of the connection. Accordingly, in the preferred embodiment the quality level is represented by a value indicating an inverse quality of the connection because if the quality level is high the actual quality of the connection is worse than normal. Also, if the quality level is low, the actual quality of the connection is better than normal. The quality level can be based on a number of packets lost per a number of packets in transmission in a network element. Thus, the quality level can be defined by means of the packet loss rate (PLR). This can be computed by the sequence number information as QL=100*Number of packets lost/Number of packets in transmission in a network element.

The quality level can depend on for example, congestion in a packet based network or weak coverage of the radio part of the network, thus both resulting in bit errors or packet lost.

Preferably, the step of observing the quality level of the connection contains observing Real-Time Protocol (RTP) header information of the connection.

In a more particular embodiment, the step of observing the quality level of the connection contains detecting at least one packet loss if there is at least one gap in a sequence of detected packets. The sequence is based on values in Real-Time Protocol (RTP) sequence number fields of the observed packets. Advantageously, a network element is able to observe the RTP header information of the connection and there is not required additional companion information about the quality of the connection.

Advantageously, if the quality level exceeds a certain maximum criteria, the codec mode is changed to a lower codec mode than a requested or currently applied codec mode. If the quality level is below a certain minimum criteria, the codec mode is changed to a higher codec mode than the requested or currently applied codec mode.

Preferably, the communication devices comprise mobile communication devices operating in a third generation mobile network, and the network contains a radio access and an Internet Protocol (IP) based fixed core.

Preferably, the operational mode of the codec contains an operational mode/bit rate of an AMR (Adaptive Multi-Rate) codec.

In a further embodiment of the invention, the step of selecting the operational mode of the codec depending on the quality level contains selecting a particular codec from the group of operational modes of the codec. The system in the embodiment contains different codecs to be applied in the communication between the first and the second communication devices via the network. The first communication device receives a command from a network entity that a particular codec for the connection is to be used. Thus, the network entity observes the quality level and, based on this observing, selects the particular codec for the connection. For example, the first and the second communication devices contain two codecs, a half rate codec and an Adaptive Multi-Rate (AMR) codec. The network entity selects the half rate codec by sending the command at least to the first communication device because the network element has observed the reduced quality of the connection.

According to a second aspect of the invention there is provided a first communication device for communicating encoded information to a second communication device via a network, the first communication device comprising:
a transmitter for transmitting information to the second communication device via the network, the information indicating from a group of operational modes of a codec, that operational mode which the first communication device uses for a connection between the first communication device and the second communication device, comprising:
means for transmitting the information in a format which enables a network element to observe a quality level of the connection between the first and the second communication device, and
means for receiving a command from the network element indicating an operational mode of the codec depending on the quality level, where the operational mode of the codec depending on the quality level is selected by the network element.

Preferably, the communication devices are mobile communication devices operating in a third generation mobile communication network.

According to a third aspect of the invention there is provided a system for communicating encoded information between a first communication device and a second communication device the system comprising the first communication device, the second communication device and a network, the first communication device comprising:
a transmitter for transmitting information from the first communication device to the second communication device via the network, the information indicating from a group of operational modes of a codec, that operational mode which the first communication device uses for a connection between the first communication device and the second communication device, wherein the network comprises
a quality level observation unit for observing a quality level of the connection between the first and the second communication device, and based on the observing
the quality level observation unit selects an operational mode of the codec depending on the quality level.

Preferably, the system comprises a third generation mobile communication system.

According to another embodiment, the quality level unit operates in a conventional Radio Network Controller (RNC) of the network.

According to a fourth aspect of the invention there is provided a computer program product for a network entity, the computer program product comprising:
computer executable code for enabling the network entity to observe a quality level of a connection between a first communication device and a second communication device where the first and the second communication device communicate via a network over the connection, and where the network entity receives information indicating an operational mode of a codec from a group of operational modes of the codec that the first communication device uses for the connection between the first communication device and the second communication device, and
computer executable code for enabling the network entity to select an operational mode of the codec depending on the quality level.

Preferably, the network entity contains at least one of a Radio Network Controller of a third generation mobile net-

BRIEF DESCRIPTION OF THE DRAWINGS

The invention will now be described, by way of example only, with reference to the accompanying drawings, in which.

DETAILED DESCRIPTION OF THE EMBODIMENTS

The present invention is generally directed to an apparatus and a method for selecting a preferable codec mode for a connection between a first communication device (UE1) and a second communication device (UE2), where the devices communicate via a network. An element in the network observes the quality level (QL) of said connection. The quality level (QL) is based on a data error level of network resource. Based on the observation the network element judges a preferable operational mode of the codec, from a group of operational modes of the codec. The preferable codec mode is based on the quality level of the connection. If the quality level (QL) of the connection is high, a lower codec mode than the requested or currently applied codec mode is selected. Also, if the quality level (QL) of the connection is low, a higher codec mode than the requested or currently applied codec mode is selected. The preferable codec mode may also be the currently applied codec. In the preferred embodiment, if a Radio Network Controller (RNC) observes congestion by observing Real-Time Protocol (RTP) header information, the RNC judges a lower codec mode than a requested or currently applied codec mode for the connection. The lower mode for the connection is judged if there is at least one gap in a sequence of detected packets. The lower mode for the connection can also be judged if there is a gap longer than a predefined threshold. In the preferred embodiment the UE1 is a wireless mobile station of a cellular radio network and the UE2 is another wireless mobile station of the same or another cellular radio network. An example of the cellular radio network is a wideband code division multiple access (WCDMA) network or another third generation network. The UE1 and/or the UE2 may also be fixed terminal operating in a fixed network. For example, the UE1 is an IP telephone coupled with an IP based network such as the Internet.

Figure 1:
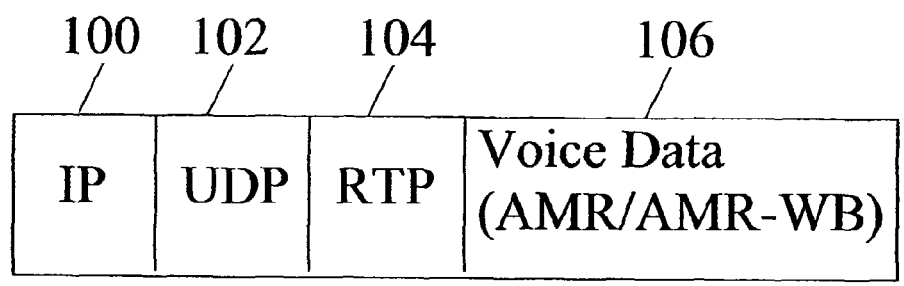
FIG. 1 shows an example of a transport protocol format where the AMR packets are transmitted over the IP in accordance with the invention.

FIG. 1 shows an example of a transport protocol format where AMR (Adaptive Multi-Rate) packets are transmitted over the IP in accordance with the invention. The VoIP (Voice over Internet Protocol) is a term used in IP telephony for a set of facilities for managing the delivery of voice information using the Internet Protocol (IP) 100. In general, this means sending voice information in digital form in discrete packets rather than in the traditional circuit switched protocols of a public switched telephone network (PSTN). Advantageously, the VoIP and Internet telephony provide means for reducing the costs of telephone service. The VoIP, now used somewhat generally, derives from the VoIP Forum, an effort by major equipment providers to promote the use of ITU-T's (Telecommunication Standardization Sector of the International Telecommunications Union) standard for sending voice (audio) and video using the IP on the Internet and within intranet. The Forum also promotes for example voice mail.

In addition to the IP 100, the communication of voice data uses RTP (Real-Time Protocol) 104 to help to ensure that packets get delivered in a timely manner. Using the Internet or public networks, it is currently difficult to guarantee the QoS. The Real-time traffic in the IP network is typically carried using UDP (User Datagram Protocol) 102 which is a very lightweight protocol. As an example, the additional services that the UDP 102 provides are source and destination ports and an optional checksum that covers the UDP/IP header. The RTP 104 can be used above the UDP 102 to add end-to-end delivery services that are useful for real-time traffic. In particular, the RTP 104 provides transmitted datagrams/packets with sequence number, payload type identification and timestamping services.

The RTP 104 is defined by the ITU (International Telecommunications Union). The RTP 104 is typically integrated into the application layer of the end-applications rather than being implemented as a separate layer in the communications software stack. The RTP 104 can be used in both unicast and multicast communication. An RTP session is defined by an IP address and a pair of UDP destination ports, one for RTP packets. In case of an audio-video conference the audio and video may use different sessions, for example, the same destination address but different port pairs. The RTP 104 is a flexible protocol and can be tailored to a particular application's needs by using for example profiles. Since each application uses only a single profile, no explicit indication of which profile is in use is necessary with the RTP 104.

One applicable codec in the invention is the AMR (Adaptive Multi-Rate) speech codec. The AMR codec is developed by the ETSI (European Telecommunications Standards Institute). The AMR codec is standardized for GSM, and is also chosen by the Third Generation Partnership Project (3GPP) as the mandatory codec for third generation systems. The AMR codec will be widely used in various cellular systems. The AMR codec is a multi-mode codec with 8 narrow band speech codec modes with bit rates 4.75, 5.15, 5.90, 6.70, 7.40, 7.95, 10.2 and 12.2 kbps, thus resulting in 8 different codec modes according to bit rate. The highest codec mode contains 12.2 kbps and the lowest codec mode contains 4.75 kbps. The sampling frequency is 8000 Hz and processing is done on 20 ms frames, for example, 160 samples per frame. The AMR codec modes are closely related to each other and use the same coding framework. Three of the AMR codec modes are already adopted standards of their own, the 6.7 kbps mode as PDC-EFR (Personal Digital Communications-Enhanced Full Rate), the 7.4 kbps mode as IS-641 codec in TDMA (Time Division Multiple Access), and the 12.2 kbps mode as GSM-EFR.

Another applicable codec in the invention is the Adaptive Multi-Rate Wideband (AMR-WB) speech codec. The AMR-WB codec was originally developed by 3GPP (3G Partnership Project) to be used in GSM and 3G systems. The AMR-WB codec will be widely used in various cellular systems.

The AMR-WB codec is a multi-mode speech codec with 9 wideband speech coding modes with bit-rates 6.6, 8.85, 12.65, 14.25, 15.85, 18.25, 19.85, 23.05 and 23.85 kbps, thus resulting in 9 different codec modes according to bit rate. The highest codec mode contains 23.85 kbps and the lowest codec mode contains 6.6 kbps. The sampling frequency is 16000 Hz and processing is performed on 20 ms frames, i.e. 320 speech samples per frame. The AMR-WB codec modes are closely related to each other and employ the same coding framework. Both codecs (AMR and AMR-WB) are applicable in the invention.

In the embodiment of the invention, the multi-mode feature of the codec is used to preserve high speech quality under a wide range of transmission conditions. In mobile communication, the mode selection allows the system to adapt the balance between speech coding and error protection to enable the best possible speech quality in prevailing transmission conditions. The mode selection can also be utilized to adapt to the varying available transmission bandwidth. Advantageously, the codec(s) can handle mode changing at least to the next lower or upper mode at any time, for example, the bit rate is changed to a lower mode 12.65 kbps from a higher mode 14.25 kbps, if there is congestion in the network resource. The codec(s) can also handle mode changing to another mode. If the quality level (QL) of the connection is high i.e. the actual quality is poor, a lower codec mode than the requested or currently applied codec mode is selected. Also, if the quality level (QL) of the connection is low i.e. the actual quality is good, a higher codec mode than the requested or currently applied codec mode is selected. The mode information is transmitted together with the speech encoded bits, to indicate the mode. For example, the mode information is attached to the RTP frame.

Both codecs (AMR, AMR-WB) include voice activity detection (VAD) and generation of comfort noise (CN) parameters during silence periods. Thus, the codecs have the option to reduce the number of transmitted bits and packets during silence periods to a minimum. The operation to send CN parameters at regular intervals during silence periods is usually called discontinuous transmission (DTX) or source controlled rate (SCR) operation. The frames containing CN parameters are called Silence Indicator (SID) frames.

Conventionally, the codecs are suitable for circuit switched cellular systems, but due to the flexibility and robustness of these codecs, they are suitable also for other preferred application. The preferred applications are real-time services over packet switched networks. Still referring to FIG. 1, coded voice data (AMR) 106 is transmitted on top of the RTP 104. The AMR format can be designed for robustness against both bit errors and packet loss. The preferred transport format of the voice data is AMR/RTP/UDP/IP as shown in the FIG. 1. The speech encoded bits have different perceptual sensitivity to bit errors and alternatively cellular systems may exploit this by using unequal error protection and detection (UEP and UED).

The payload format supports several means to increase robustness against packet loss. The simple scheme of repetition of previously sent data is one possibility. Another possible scheme which is more bandwidth efficient is to use payload external FEC (Forward Error Correction), which generates extra packets containing repair data. The whole payload can also be sorted in sensitivity order to support external FEC schemes using UEP.

Several frames can be encapsulated into a single packet to decrease protocol overhead. One of the drawbacks of such an approach is that in case of packet loss this means loss of several consecutive speech frames, which usually causes clearly audible distortion in reconstructed speech. Interleaving of frames can improve the speech quality in such cases by distributing the consecutive losses into series of single frame losses. Interleaving and bundling several frames per payload will also increase end-to-end delay and is therefore not applicable to all types of applications. However, streaming applications are able to exploit interleaving to improve speech quality in lossy transmission conditions.

Figure 2:
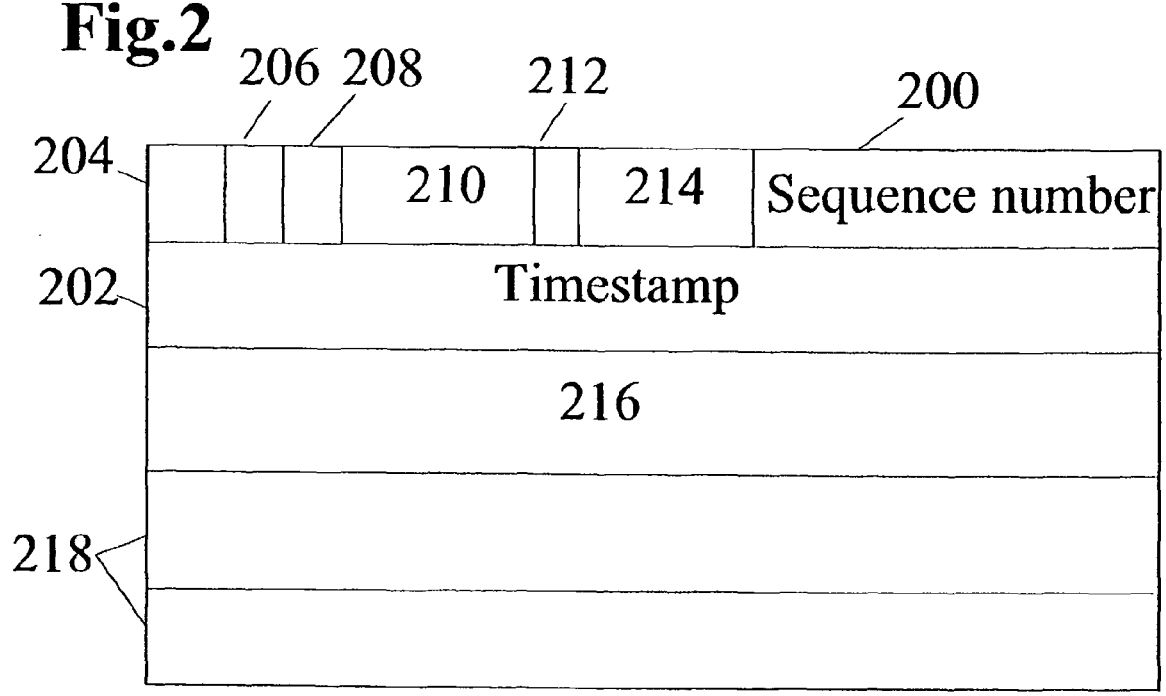
FIG. 2 shows an example of the RTP header information which is observed in accordance with the invention.

FIG. 2 shows an example of RTP header information which is observed in the RNC (Radio Network Controller) in accordance with the invention. The UE1 (or UE2 respectively) increments a sequence number field 200 (16 bits) by 1 each time it sends an RTP packet. Alternatively, the RNC1 (or RNC2 respectively) can increment the sequence number field 200 by 1 each time it sends an RTP packet. The increment enables the RNC2 (or the RNC1 respectively) to restore the initial packet sequence in the event of any reordering that may have occurred during transmission through the network. Alternatively, the UE1 (or the UE2 respectively) can restore the packet sequence. Advantageously, in addition to the reordering, the RNC2 (or the RNC1 respectively) can detect packet loss if there is at least one gap in the sequence of received packets. The RNC can observe the quality of the connection such as the congestion of the network or weak network coverage and determine the reduced QoS if there is at least one gap in the sequence of received packets. There may also be several gaps in the sequence of received packets. For example, if there has been previously received packets with sequence numbers 1, 2, 3 and then received packets 7 and 8, the receiving device can detect the reduced quality. Advantageously, in case the quality level is below a certain threshold, the RNC is able to select the lower codec mode for the connection in order to improve the QoS. The initial value of the sequence number is chosen at random. A timestamp field 202 (32 bits) reflects the sampling instant of the RTP packet and allows the RNC2 or UE2 (RNC1 or UE1 respectively) to ensure that each packet is "played" at the correct point in time to ensure that the original timing relationship between the samples is maintained. Alternatively, in the case of sources that generate RTP packets periodically, for example fixed audio, the timestamp does not explicitly represent an absolute time. Instead, it would be incremented by one at each sampling interval.

In addition to the sequence number field 200 and the timestamp field 202, the RTP header information may comprise the following fields. A version field 204 (1 bit) identifies the version of the RTP 104. If a padding field 206 (1 bit) is set, it indicates that the packet contains one or more octets at the end which are not part of the payload. For example, in the case if certain encryption algorithms are being used. If the value of the padding field=1, then the last octet of the packet or header indicates how many octets of padding there are in total. If an extension field 208 (1 bit) is set, it indicates that the fixed header is followed by a single variable length header extension containing additional fields. The third and fourth octets of this header extension indicate its length. Thus, applications not supporting this header extension can ignore it. This kind of header extension may be used as a temporary measure to allow individual implementations to experiment with new payload-format independent functions. If the assessment of the new functions proved favourable then they could be captured in a new profile specification. A CSRC (contributing source) count field 210 (4 bits) is the number of CSRC identifiers that follow the fixed header. A marker field 212 (1 bit) allows significant points to be marked in the traffic stream. For example, frame boundaries can be marked by the marker field 212. A payload type field 214 (7 bits) identifies the format of the RTP payload. A SSRC (Synchronisation source) field 216 (32 bits) identifies the synchronisation source of a group of packets. It is a randomly chosen value meant to be globally unique within a particular RTP session. All packets from the same synchronisation source form a part of the same timing and sequence number. An example of a synchronisation source is a microphone or a mixer. A CSRC (Contributing Source) list 218 is required when mixing is performed. A mixer accepts packets from one or more synchronisation sources, possibly changes the data format and combines the packets in some manner to form a combined RTP packet to be forwarded. The SSRC of the combined packet will be equal to that of the mixer while the CSRC list identifies all of the original SSRCs that contributed to the combined stream.

Figure 3:
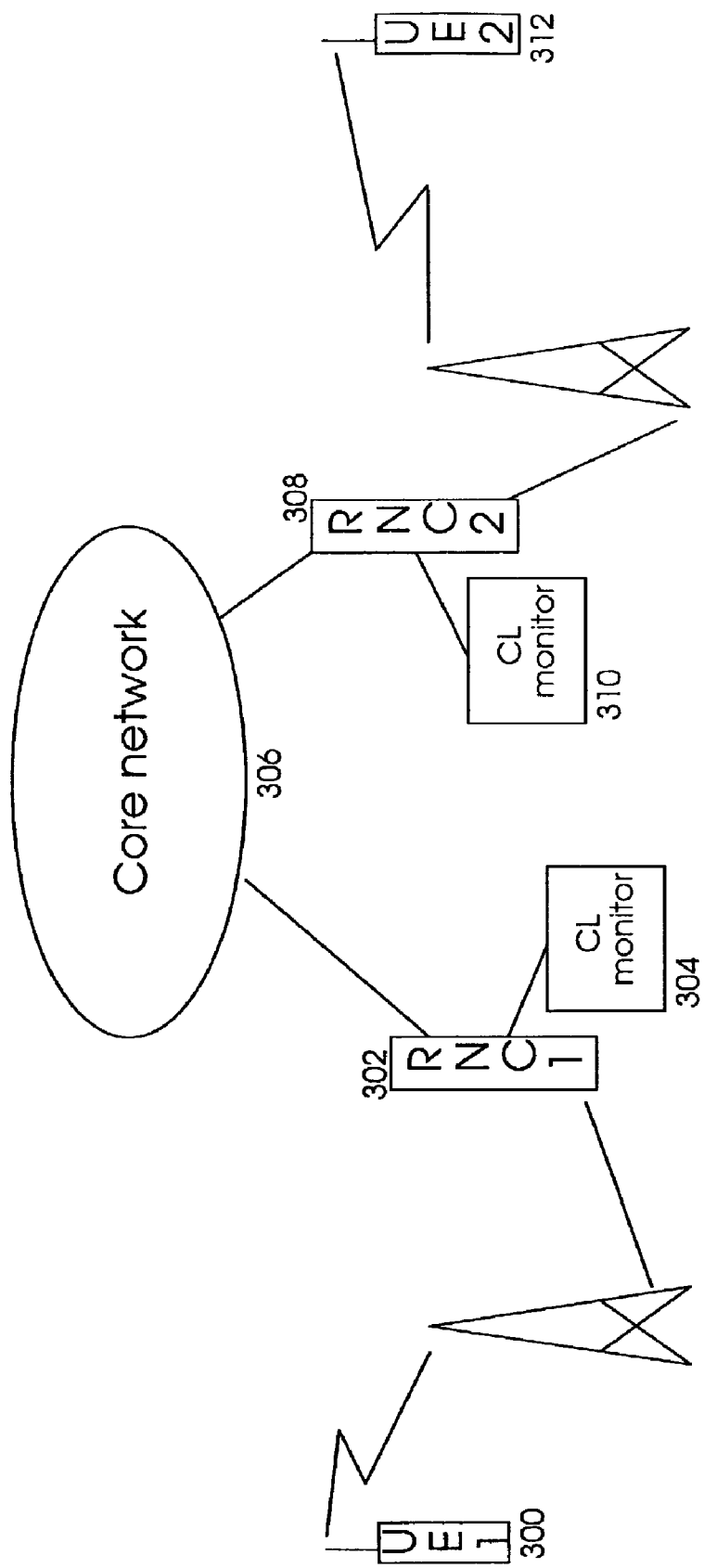
FIG. 3 shows an embodiment of the third generation telecommunication system where RTP header information is observed.

FIG. 3 shows an embodiment of the third generation telecommunication system where the RTP header information is observed. UE1 (first communication device) 300 is coupled with RNC1 (first Radio Network Controller) 302 via a radio path and a base station. The RNC1 302 comprises a Quality Level (QL) observation unit 304. The QL observation unit 304 observes a bit error/a packet loss rate of the network based on the RTP header information and accordingly the RNC (302 or 308) decides whether to change the codec mode of the connection. The QL observation unit 304 is a computing software running in a conventional RNC. Alternatively, the QL observation unit 304 can be hardware or middleware implemented by, for example, a Digital Signalling Processor(s) (DSP). The RNC1 302 communicates with RNC2 (second Radio Network Controller) 308 via a core network 306. The core network 306 enables the transfer of IP based data information. Moreover, the UE1 300 and the RNC1 (UE2 312 and the RNC2 308 respectively) can communicate by the IP based data information. The RNC2 308 comprises the QL observation unit 310 which is equivalent to the QL unit 304 but operating under the RNC2 308. The RNC2 308 is coupled with the UE2 (second communication device) 312 via a radio path.

Figure 4:
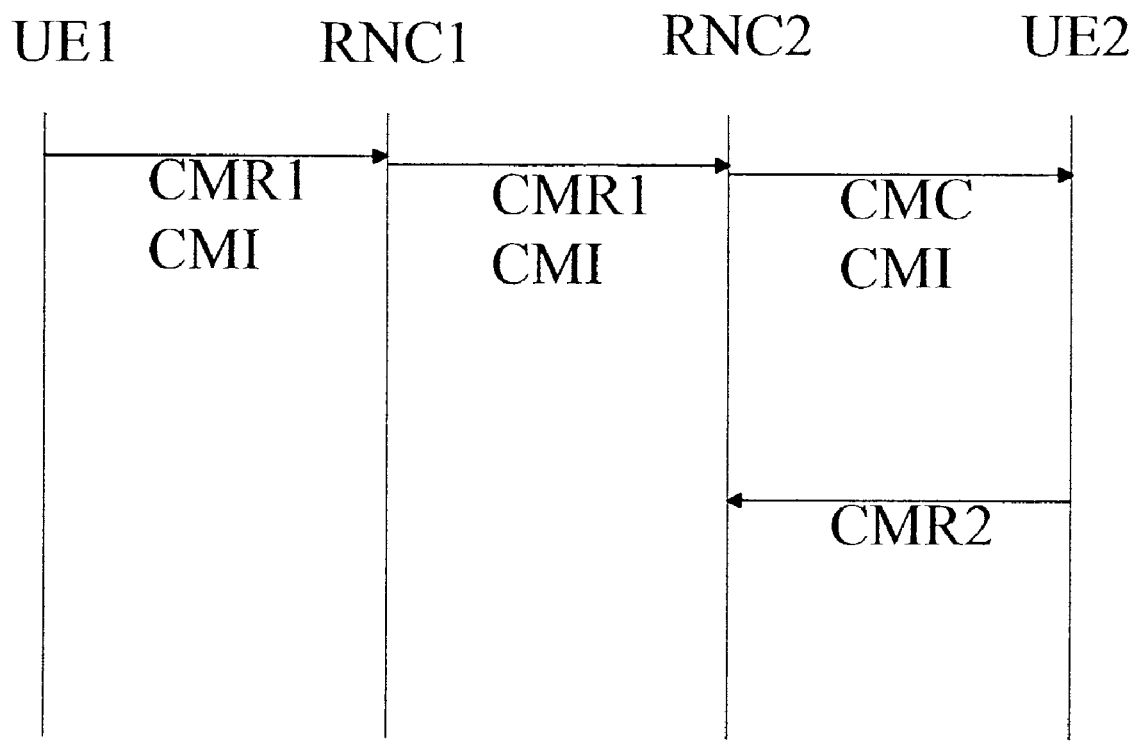
FIG. 4 shows a signalling diagram in changing the codec mode to a codec mode which is based on the quality level of the connection according to an embodiment of the invention.

In the embodiment of FIG. 4 data traffic relating to the communication between the uplink and the downlink can be transferred via the same path. The codec related information, request and command (CMI, CMR, CMC) are applicable to run in the cellular radio network.

FIG. 4 shows a signalling diagram in changing the applied codec mode to the codec mode which depends on the quality level of the connection according to an embodiment of the invention. The UE1 sends the information CMI and a request for codec mode 12.2 kbps ($CMR_1$) to the RNC1. The actual voice data communication in accordance with the $CMR_1$ and the CMI is designed to the UE2. The RNC1 receives and forwards the CMI and the $CMR_1$ to the RNC2. The RNC2 receives the CMI and the $CMR_1$. The RNC2 observes the network traffic and is able to study the data stream as referred to the examples of FIGS. 1, 2 and 3. If the RNC2 detects, based on studying, that a substantial amount of the packets are missing, the RNC2 creates and stores a new lower value, for example, 10.2 kbps for the request $CMR_1$. The substantial amount of missing packets is an adjustable amount of the packets depending on the required QoS set by a network operator. The RNC2 creates the command CMC indicating the applied codec mode 10.2 kbps based on the $CMR_1$. The RNC2 transmits the CMC and the information CMI to the UE2. The UE2 receives the CMC and the CMI and sends a request for codec mode 7.95 kbps ($CMR_2$) to the RNC2. The UE2 sends the request for codec mode 7.95 kbps because the UE2 has detected reduced quality for the radio path between the RNC2 and UE2. The RNC2 receives the $CMR_2$. The RNC2 compares the stored 10.2 kbps $CMR_1$ to the 7.95 kbps $CMR_2$. If the value of the $CMR_2$ is smaller than the value of the $CMR_1$, the applied codec mode is selected to be the lower 7.95 kbps $CMR_2$. If the value of the $CMR_1$ had been smaller than the value of the $CMR_2$, the applied codec mode would have been selected to be the lower $CMR_1$ instead of $CMR_2$. Advantageously, the applied codec mode can be contained in the one of the RTP or the AMR fields. The codec requests can be contained in a packet(s) or frame(s), and/or they can be contained in transmission protocol field, for example in the RTP or the AMR field. In the example of FIG. 4, if the UE2 had not detected the reduced quality in the radio path, the RNC2 would have selected the codec mode 10.2 kbps. Advantageously, the codec mode selection is based on the QoS of the actual network, the network comprising both the radio access and the core network.

If the flow of speech data is from UE2 to UE1, the RNC1 has the essential role in the codec mode selection process, and advantageously the communication between the UE2 and UE1 may take place in accordance with the preferable communication mode.

Figure 5A:
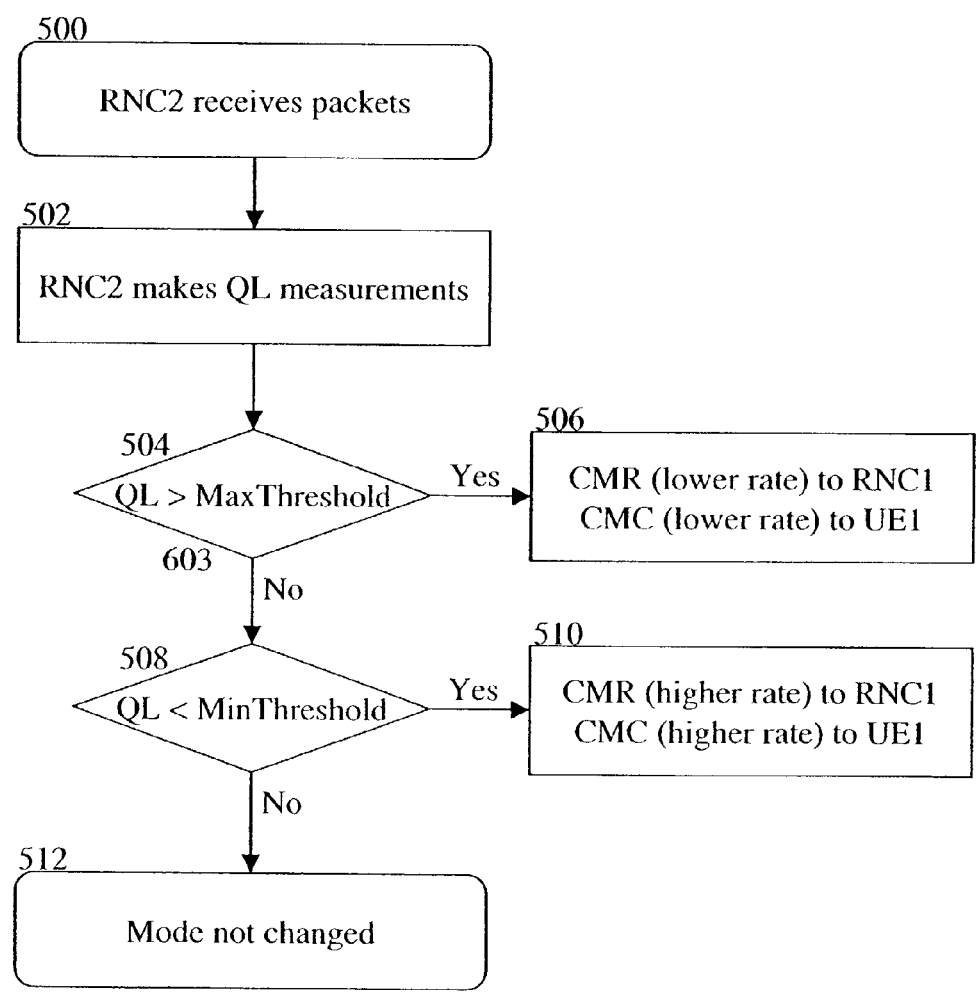
FIG. 5A shows in form of a flow chart a method for selecting the codec mode for downlink traffic according an embodiment of the invention.
Figure 5B:
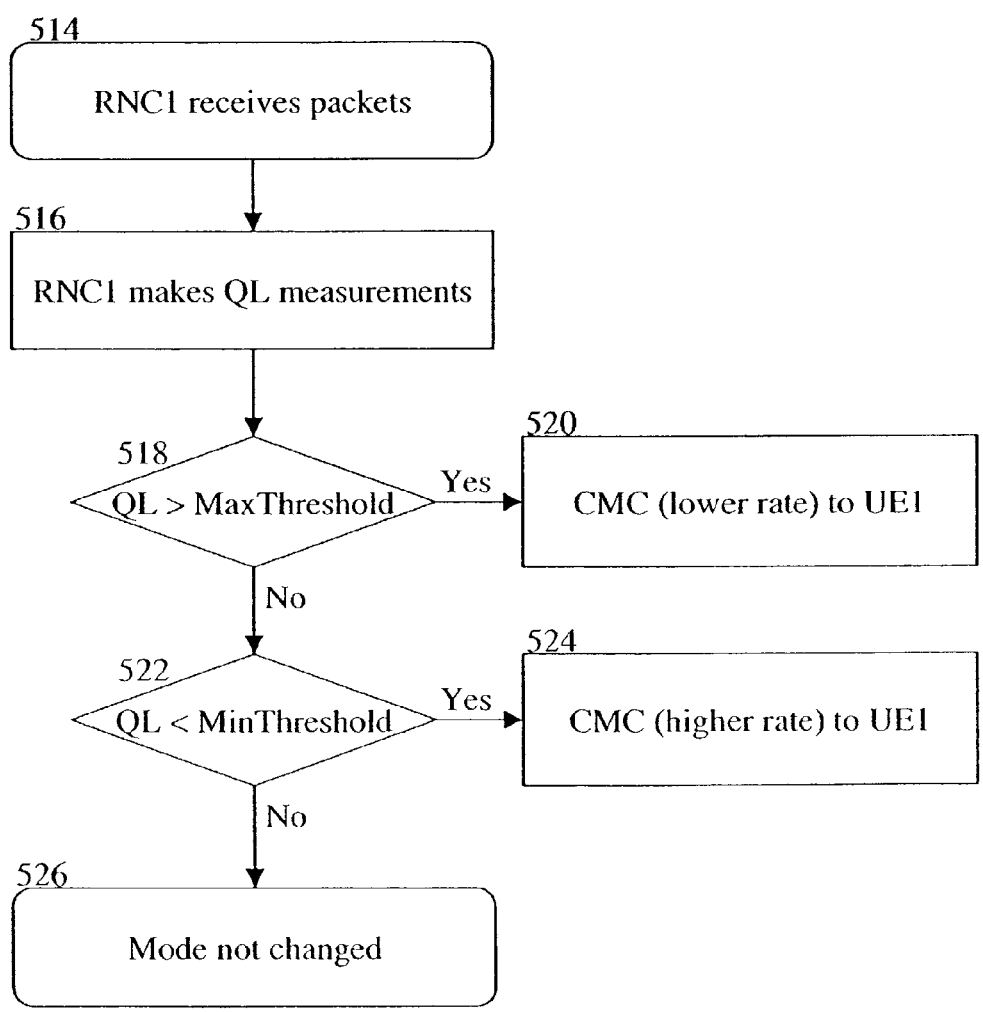
FIG. 5B shows in form of a flow chart a method for selecting the codec mode for uplink traffic according to an embodiment of the invention.

In FIGS. 5A and 5B a flow of speech data is considered to be: UE1→RNC1→RNC2→UE2. The inverse data flow, UE2→RNC2→RNC1→UE1, is also applicable and operates inversely.

FIG. 5A shows a method for selecting the codec mode for downlink traffic according to an embodiment of the invention. The RNC2 receives packets as the intended communication between UE1 and UE2 takes place (Step 500). The RNC2 makes Quality Level (QL) measurements (Step 502) and is able to detect packet losses based on the data communication between the UE1 and the RNC2 including, but not limited, communication over the radio interface and the core network. The RNC2 observes the network traffic and is able to study the data stream as referred to the examples of FIGS. 1, 2 and 3. In condition 504, based on the measurements if the QL is greater than a maximum threshold (MaxThreshold), the RNC2 selects a lower codec mode than the requested or currently applied codec mode (Step 506). The RNC2 selects the lower codec mode by sending a request indicating lower codec mode ($CMR_{LO}$) to the RNC1. For example, the RNC2 has received a codec mode request for 23.05 kbps codec mode, and the RNC2 observes reduced quality and changes the codec mode request to the 19.85 kbps $CMR_{LO}$. The selection of the lower codec mode comprises also sending the command $CMC_{LO}$ to the UE1. This can be a separate message or contained in the request $CMR_{LO}$ which is sent to the RNC1. In the condition 504, if the QL is not greater than the Maxthreshold, the RNC2 performs another condition 508. In the condition 508, if the QL is smaller than a minimum threshold (MinThreshold), the RNC2 selects a higher codec mode than the requested or currently applied codec mode (Step 510). The RNC2 selects the higher codec mode by sending a request indicating higher codec mode ($CMR_{HI}$) to the RNC1. For example, The RNC2 has received a codec mode request for 15.85 kbps, and the RNC2 observes that the QL is smaller than the MinThreshold and changes the codec mode to the 18.25 kbps $CMR_{HI}$. The selection of the higher codec mode comprises also sending the command $CMC_{HI}$ to the UE1. The $CMC_{HI}$ intended to the UE1 can be a separate message or contained in the request $CMR_{HI}$ which is sent to the RNC 1. In the condition 508, if the QL is not smaller than MinTheshold, the codec mode is not changed and the process ends (Step 512).

FIG. 5B shows a method for selecting the codec mode for uplink traffic according to an embodiment of the invention. The RNC 1 receives packets as the intended communication between the UE1 and the UE2 takes place (Step 514). The RNC1 makes Quality Level (QL) measurements (Step 516) and is able to detect packet losses based on the communication between the UE1 and the RNC1 including, but not limited, communication over the radio interface and the core network. The RNC1 observes the data traffic and is able to study the data stream as referred to the examples of FIGS. 1, 2 and 3. In condition 518, based on the measurements if the QL is greater than a maximum threshold (MaxThreshold), the RNC1 selects a lower codec mode than the requested or currently applied codec mode (Step 520). The RNC1 selects the lower codec mode by sending a command indicating lower codec mode ($CMC_{LO}$) to the UE1. For example, the RNC1 has received a codec mode request for 12.2 kbps codec mode, and the RNC1 observes congestion and changes the codec mode to the 10.2 kbps CMC LO Thus, the $CMC_{LO}$ indicates lower codec mode than the codec mode which is initially received or currently applied at the RNC 1. In the condition 518, if the QL is not greater than the Maxthreshold, the RNC1 performs another condition 522. In the condition 522, if the QL is smaller than a Minimum Threshold (MinThreshold), the RNC1 selects a higher codec mode than the requested or currently applied codec mode (Step 524). The RNC1 selects the higher codec mode by sending a command indicating higher codec mode ($CMC_{HI}$) to the UE1. For example, the RNC1 has received a codec mode request for 6.70 kbps codec mode, and the RNC1 observes that the QL is smaller than the MinThreshold and changes the codec mode to the 7.40 kbps $CMC_{HI}$. In the condition 522, if the QL is not smaller than MinTheshold, the codec mode is not changed and the process ends (Step 526).

The minimum threshold (MinThreshold) indicates respectively the minimum quality level below which it is allowed to switch to a higher codec mode. The maximum quality threshold (MaxThreshold) respectively indicates the maximum quality level above which it is recommended to switch to a lower codec mode by the network element such as the RNC. The distance between the MinThreshold and the MaxThreshold determines the sensitivity of the process. The MinThreshold and the MaxThreshold can be defined by the network operator. The quality of the connection in packet based network, comprising at least the radio path and the core part, can depend generally on two factors: 1) The number of packets in a queue and 2) the size of the packets in the queue. For quality measurement RNCs do not make use of the RTCP information, but the RTP header information. In particular, the RNCs make use of the sequence number field to check if the natural sequence spaced by one unit has been broken or interrupted, due to one or more packet lost.

The QL is defined by means of the packet loss rate (PLR). This can be computed by the sequence number information as QL=100*Number of packets lost/Number of packets in transmission in RNC.

Because of the nature of the speech, it may be useless to keep all the history of packet losses since the beginning of the flow. For example, it is not important if the speech quality was bad 1 minute ago, if it is good now. The QL measurement can be restricted to the latest period of time T, where T can be defined by the operator. In synthesis, points of time to determine the QL are the following. 1) When the codec (AMR) mode is changed. These operations happen when the traffic checked in RNC is really transmitted with a new codec (AMR) mode. 2) During a normal operation if time>T. Thus, if the time index T is exceeded.

Another variable that is defined by the network operator is the amount of time needed before the codec (AMR) mode can be changed. For example, it could be unsuitable to react too quickly when a packet loss occurs, but instead it would be better to change mode if the lossy condition persists for 1 or 2 seconds. This time can be defined by a variable R (reaction time).

A transcoding enables a usage of different codec mode between different elements having different codecs in the network. For example, between the MS and the PSTN in the GSM, where the MSC (Mobile Switching Centre) contains the transcoding. The transcoding further enables a usage of different codec (AMR) mode between the UE1 and the UE2 when the voice call is active. Preferably, the codec (AMR) modes should be the same in the UE1 and in the UE2 when the voice call is activated, but the core network can adapt the communication by transcoding if the codec (AMR) modes of the UE1 and the UE2 are different. Disadvantageously, the transcoding creates delays in the communication.

Figure 6:
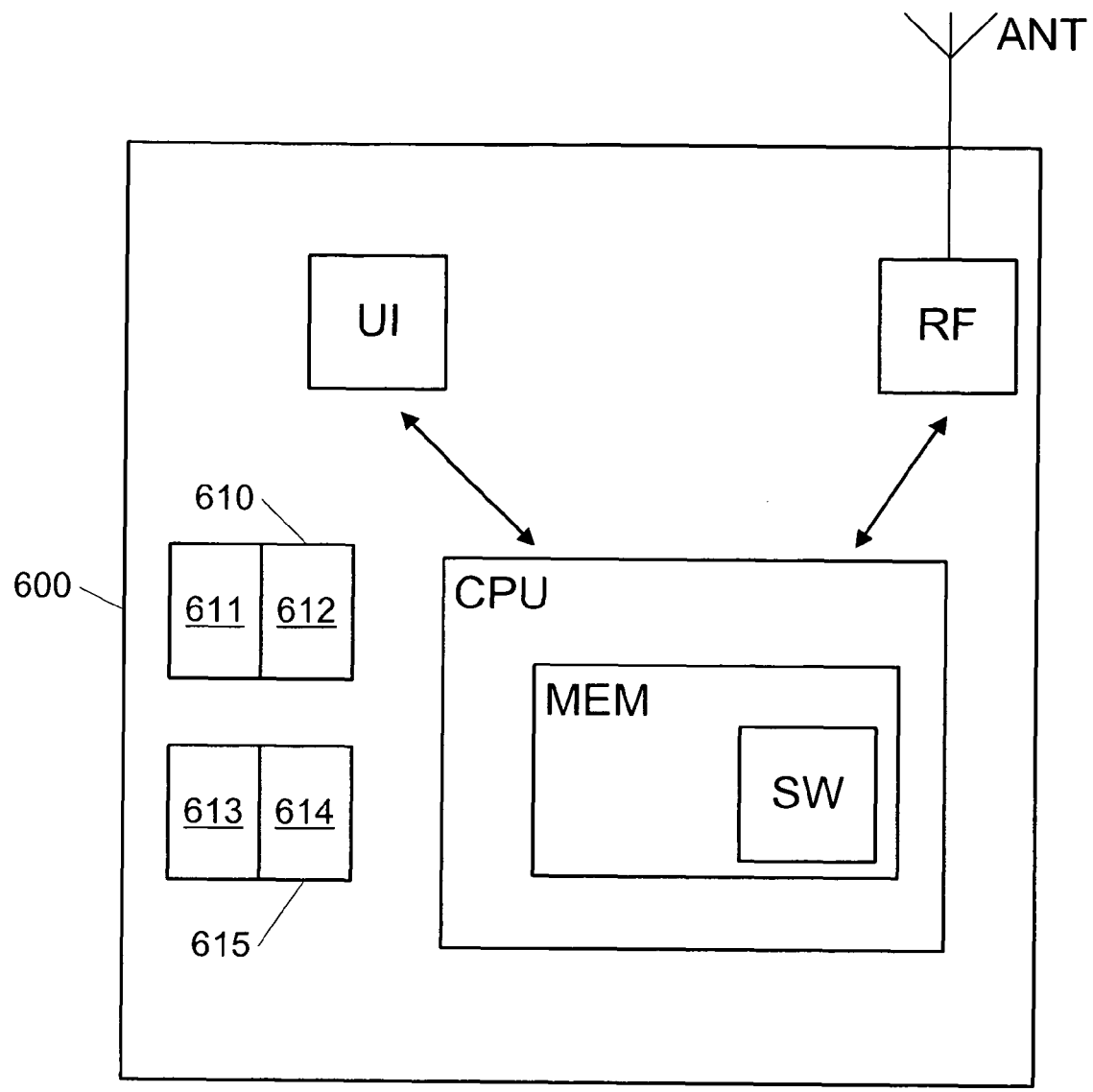
FIG. 6 shows a mobile station according to the invention.

FIG. 6 shows a cellular mobile station 600 according to the invention. The mobile station 600 shown operates as the UE1. A corresponding mobile station may operate as the UE2. The mobile station 600 comprises a processing unit CPU, a radio frequency part RF and a user interface UI. The radio frequency part RF and the user interface UI are coupled to the processing unit CPU. The user interface UI comprises a display and a keyboard (not shown) to enable a user to use the mobile station 700. In addition, the user interface UI comprises a microphone and a speaker for receiving and producing audio signals. The user interface UI may also comprise voice recognition (not shown). The processing unit CPU comprises a microprocessor (not shown), memory MEM and software SW. The software SW is stored in the memory MEM. The microprocessor controls, on the basis of the software SW, the operation of the mobile station 600, such as the use of the radio frequency part RF and the presenting of information in the user interface UI and the reading of inputs received from the user interface UI. The software SW comprises a WCDMA protocol stack on the basis of which a transmitter (not shown) of the radio frequency part RF transmits and a receiver (not shown) of the radio frequency part RF receives messages and other information with the aid of its antenna ANT. The codecs 610, 615, the selection of which is negotiated, reside in the mobile station 600. They may be implemented in the software SW. Another alternative is hardware implementation of the codecs 610 615. The codecs 610, 615 may each be comprised of encoders 611, 613 and decoders 612; 614.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims. For example, the observation can be done in a unit in the edge of the $3^{rd}$ generation network with an assumption that operator controlled $3^{rd}$ generation network does not substantially lose packets. For another example, the observation can be done in a Base Station Controller. For another example, the observation can be done in an element in a General Packet Radio System (GPRS) Enhanced Radio Access Network (GERAN).

The invention claimed is:
1. A method, comprising:
communicating from a first communication device information indicating a current operational mode of a group of operational modes of an encoder the first communication device uses for a connection between the first and a second communication device, where the first and the second communication device communicate via a network, observing a quality level of the connection between the first and the second communication device in the network, and based on the observing selecting a new operational mode of the group of operational modes of the encoder depending on the quality level, wherein observing the quality level of the connection comprises observing real time protocol header information of the connection, wherein the real time protocol header information comprises a sequence number field and a timestamp field.

2. The method according to claim 1, wherein observing the quality level of the connection comprises detecting at least one packet loss if there is at least one gap in a sequence of detected packets, wherein the sequence is based values in real time protocol sequence number fields.

3. The method according to claim 2, wherein the new operational mode is selected if a certain amount of packet loss is observed.

4. The method according to claim 1, wherein an element of the network observes the quality level.

5. The method according to claim 1, wherein the quality level comprises a data error rate of the connection.

6. The method according to claim 1, wherein the quality level is based on a number of packets lost per a number of packets in transmission in a network element.

7. The method according to claim 1, wherein the new operational mode of the encoder is a lower operational mode if the quality level is above a certain maximum level.

8. The method according to claim 1, wherein the new operational mode of the encoder is a higher operational mode if the quality level is below a certain minimum level.

9. The method according to claim 1, wherein an element of the network selects the new operational mode of the encoder depending on the quality level by sending a command indicating the new operational mode of the encoder at least to the first communication device.

10. The method according to claim 1, wherein at least one of the communication devices comprises a mobile communication device.

11. The method according to claim 1, wherein the network comprises a radio access network and a fixed core network.

12. The method according to claim 1, wherein the new operational mode of the encoder comprises an operational mode of an adaptive multi rate encoder.

13. The method according to claim 12, wherein the operational mode of the adaptive multi rate encoder comprises a bit rate of the adaptive multi rate encoder.

14. An apparatus, comprising:
at least one encoder comprising a group of operational modes for encoding information transmitted in a connection between said apparatus and a communication device; and
a receiver for receiving a command from a network element indicating a preferred operational mode of the encoder for the apparatus to use depending on a quality level of the connection;
wherein said command is based at least on real time protocol header information of the connection, wherein the real time protocol header information comprises a sequence number field and a timestamp field.

15. A system, comprising:
a transmitter for transmitting information from a first communication device to a second communication device via a network, the information indicating a current operational mode of a group of operational modes of a codec the first communication device uses for a connection between the first communication device and the second communication device, and
a quality level observation unit for observing a quality level of the connection between the first and the second communication device, and based on the observing
the quality level observation unit selects a new operational mode of the codec depending on the quality level,
wherein observing the quality level of the connection comprises observing real time protocol header information of the connection, wherein the real time protocol header information comprises a sequence number field and a timestamp field.

16. The system according to claim 15, wherein the system further comprises at least one of a radio network controller of a third generation mobile network, base station controller and an element in a general packet radio system enhanced radio access network.

17. A computer program product comprising a computer readable storage structure embodying computer program code thereon for execution by a computer processor, wherein said computer program code comprises instructions for execution by said processor for:
observing a quality level of a connection between a first communication device and a second communication device where the first and the second communication device communicate via a network over the connection, and where the network entity receives information indicating a current operational mode a group of operational modes of an encoder the first communication device uses for the connection between the first communication device and the second communication device, and
selecting a new operational mode of the encoder depending on the quality level,
wherein observing the quality level of the connection comprises observing real time protocol header information of the connection, wherein the real time protocol header information comprises a sequence number field and a timestamp field.

18. A method, comprising:
communicating from a first communication device information indicating a current operational mode of a group of operational modes of a decoder the first communication device uses for a connection between the first and a second communication device, where the first and the second communication device communicate via a network,
observing a quality level of the connection between the first and the second communication device in the network, and based on the observing
selecting a new operational mode of the group of operational modes of the decoder depending on the quality level,
wherein observing the quality level of the connection comprises observing real time protocol header information of the connection, wherein the real time protocol header information comprises a sequence number field and a timestamp field.

19. The method according to claim 18, wherein observing the quality level of the connection comprises detecting at least one packet loss if there is at least one gap in a sequence of detected packets, wherein the sequence is based values in real time protocol sequence number fields.

20. The method according to claim 18, wherein an element of the network observes the quality level.

21. The method according to claim 18, wherein the quality level comprises a data error rate of the connection.

22. The method according to claim 18, wherein the quality level is based on a number of packets lost per a number of packets in transmission in a network element.

23. The method according to claim 18, wherein the new operational mode of the decoder is a lower operational mode if the quality level is above a certain maximum level.

24. The method according to claim 18, wherein the new operational mode of the decoder is a higher operational mode if the quality level is below a certain minimum level.

25. The method according to claim 18, wherein the new operational mode of the decoder is selected if a certain amount of packet loss is observed.

26. The method according to claim 18, wherein an element of the network selects the new operational mode of the decoder depending on the quality level by sending a command indicating the new operational mode of the decoder at least to the first communication device.

27. The method according to claim 18, wherein at least one of the communication devices comprises a mobile communication device.

28. The method according to claim 18, wherein the network comprises a radio access network and a fixed core network.

29. The method according to claim 18, wherein the new operational mode of the decoder comprises an operational mode of an adaptive multi rate decoder.

30. The method according to claim 29, wherein the new operational mode of the adaptive multi rate decoder comprises a bit rate of the adaptive multi rate decoder.

31. An apparatus, comprising:
at least one encoder comprising a group of operational modes for encoding information transmitted in a connection between said apparatus and a communication device; and
means for receiving a command from a network element indicating a preferred operational mode of the encoder for the apparatus to use depending on a quality level of the connection;
wherein said command is based at least on real time protocol header information of the connection, wherein the real time protocol header information comprises a sequence number field and a timestamp field.

32. An apparatus, comprising:
at least one decoder comprising a group of operational modes for decoding information transmitted in a connection between said apparatus and a communication device; and
a receiver for receiving a command from a network element indicating a preferred operational mode of the decoder for the apparatus to use depending on a quality level of the connection;
wherein said command is based at least on real time protocol header information of the connection, wherein the real time protocol header information comprises a sequence number field and a timestamp field.

33. An apparatus, comprising:
at least one decoder comprising a group of operational modes for decoding information transmitted in a connection between said apparatus and a communication device; and
means for receiving a command from a network element indicating a preferred operational mode of the decoder for the apparatus to use depending on a quality level of the connection;
wherein said command is based at least on real time protocol header information of the connection, wherein the real time protocol header information comprises a sequence number field and a timestamp field.

34. A computer program product comprising a computer readable storage structure embodying computer program code thereon for execution by a computer processor, wherein said computer program code comprises instructions for execution by said processor for:
observing a quality level of a connection between a first communication device and a second communication device where the first and the second communication device communicate via a network over the connection, and where the network entity receives information indicating a current operational mode a group of operational modes of a decoder the first communication device uses for the connection between the first communication device and the second communication device, and
selecting a new operational mode of the decoder depending on the quality level,
wherein observing the quality level of the connection comprises observing real time protocol header information of the connection, wherein the real time protocol header information comprises a sequence number field and a timestamp field.

* * * * *